July 31, 1951 M. L. BLAKESLEE 2,562,656
FUEL SYSTEM FOR INTERNAL-COMBUSTION ENGINES
Filed March 26, 1946 3 Sheets-Sheet 1

INVENTOR
Max L. Blakeslee
BY Fishburn & Mullendore
ATTORNEYS

July 31, 1951  M. L. BLAKESLEE  2,562,656
FUEL SYSTEM FOR INTERNAL-COMBUSTION ENGINES
Filed March 26, 1946  3 Sheets-Sheet 2
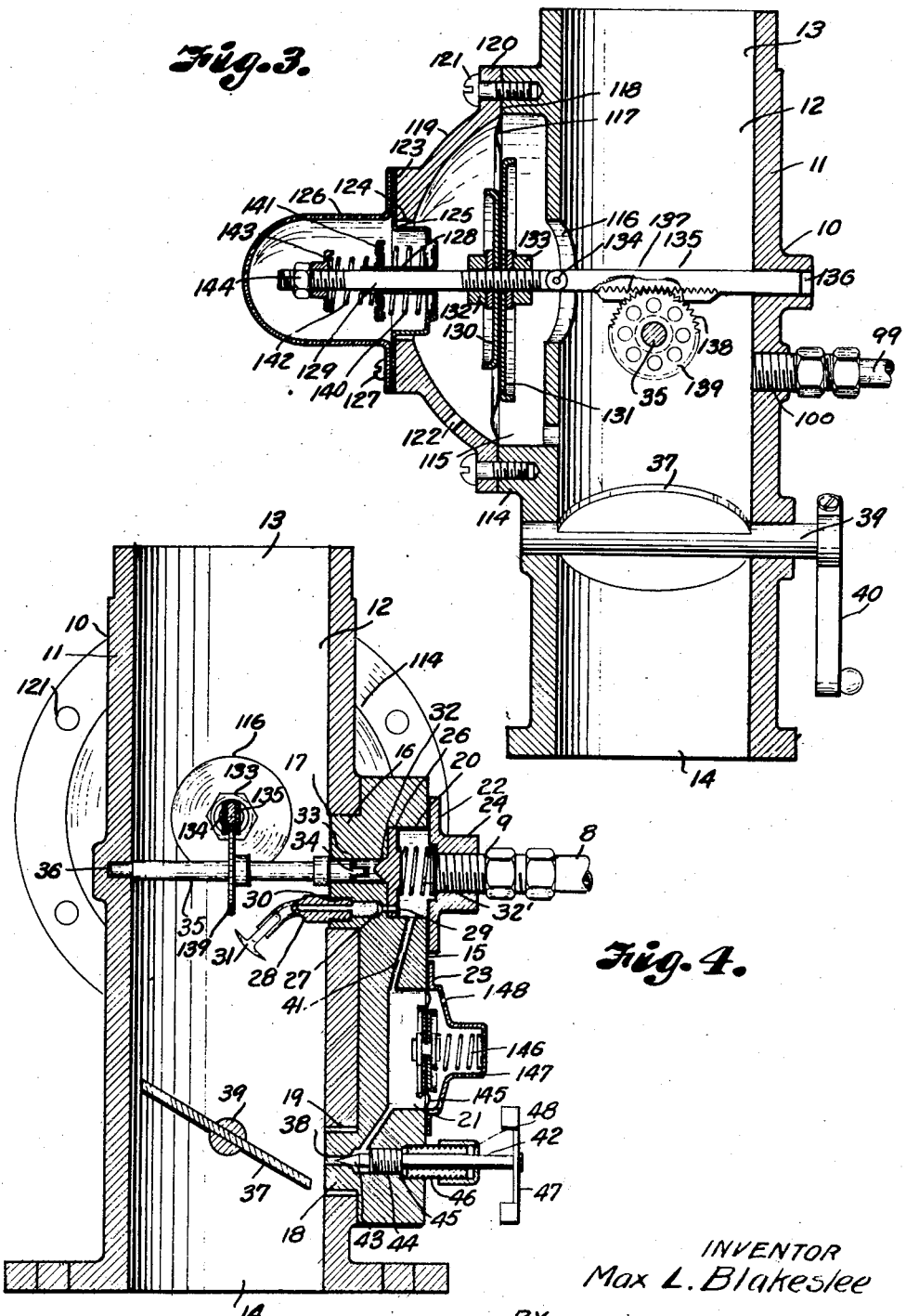
INVENTOR
Max L. Blakeslee
BY Fishburn & Mullendore
ATTORNEYS

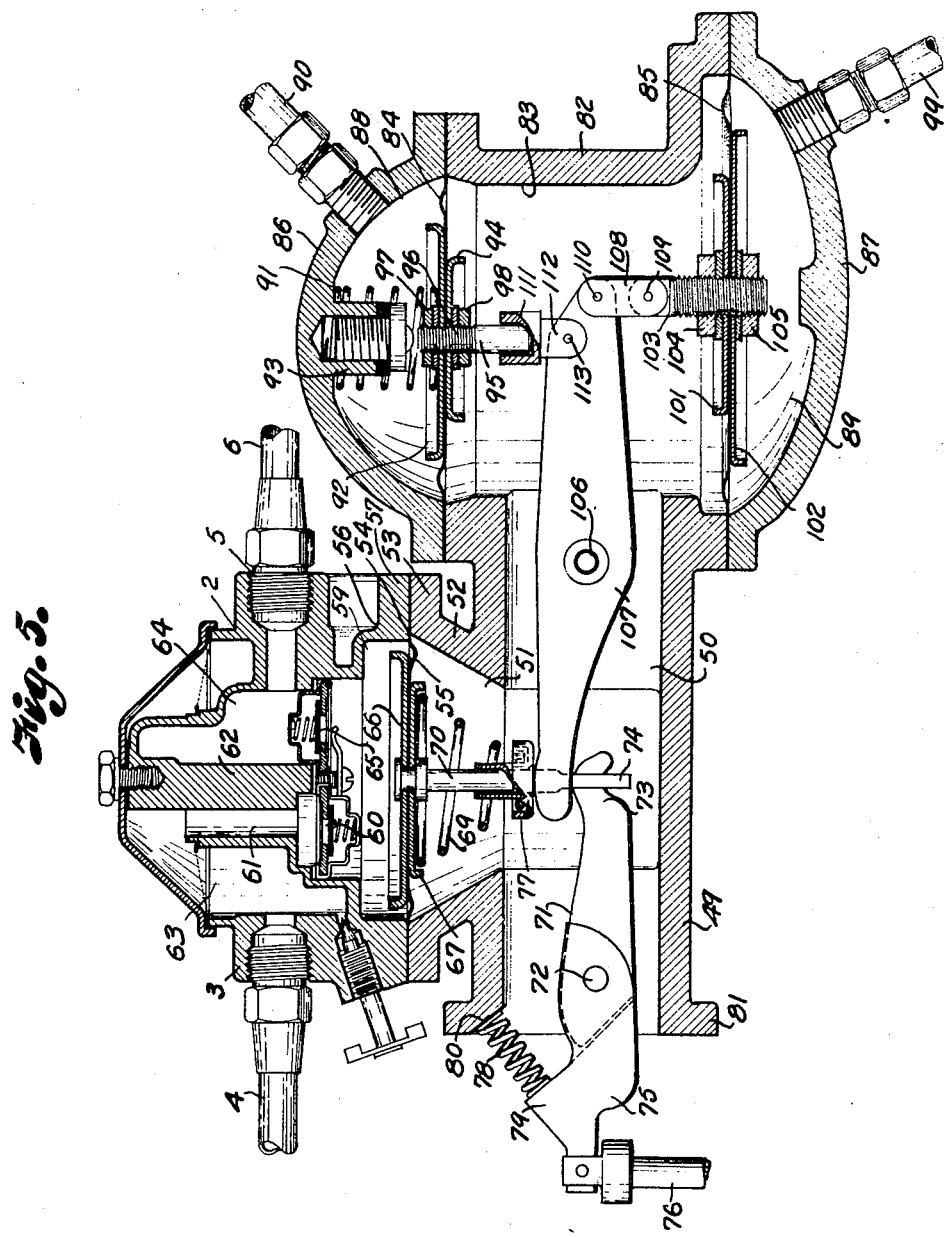

Patented July 31, 1951

2,562,656

UNITED STATES PATENT OFFICE 2,562,656

FUEL SYSTEM FOR INTERNAL-COMBUSTION ENGINES

Max L. Blakeslee, Oklahoma City, Okla.

Application March 26, 1946, Serial No. 657,102

3 Claims. (Cl. 261—27)

This invention relates to apparatus for supplying a combustible mixture to internal combustion engines, particularly those operating under variable speed and/or load conditions and has for its principal object to provide for automatically proportioning the amount of air and fuel responsive to varying operating conditions of such motors and thereby maintain optimum efficiency regardless of variable loads and/or speeds.

Other objects of the invention are to provide a fuel feeding and proportioning apparatus that responds instantaneously to change in operating conditions of an engine; to provide a fuel feeding apparatus that supplies air in quantity to maintain maximum volumetric efficiency within the combustion chambers of an engine; to provide a fuel feeding apparatus that will supply the proper ratio of fuel and air to a motor under all atmospheric conditions, thus eliminating the use of manual or automatic chokes; to provide a fuel feeding apparatus capable of handling fuels which vary greatly in quality; to provide a fuel feeding apparatus that will deliver fuel into a high compression motor so as to give smooth operation; and to provide a fuel feeding apparatus that gives greater fuel economy at high speeds.

It is also an object of the invention to provide for controlling feed of fuel by altering the pressure on the diaphragm of the fuel pump in accordance with pressures on the respective sides of the throttle valve, which pressures are brought about by variable conditions in engine operation.

In accomplishing these and other objects of the invention hereinafter pointed out, I have provided improved structure, the preferred form of which is illustrated in the accompanying drawings wherein:

Fig. 3 is a vertical section through the carburetor portion of the apparatus.

Fig. 4 is a similar section taken at right angles to the section shown in Fig. 3.

Fig. 5 is an enlarged longitudinal section through the fuel pump and control mechanism therefor.

Figure 2:
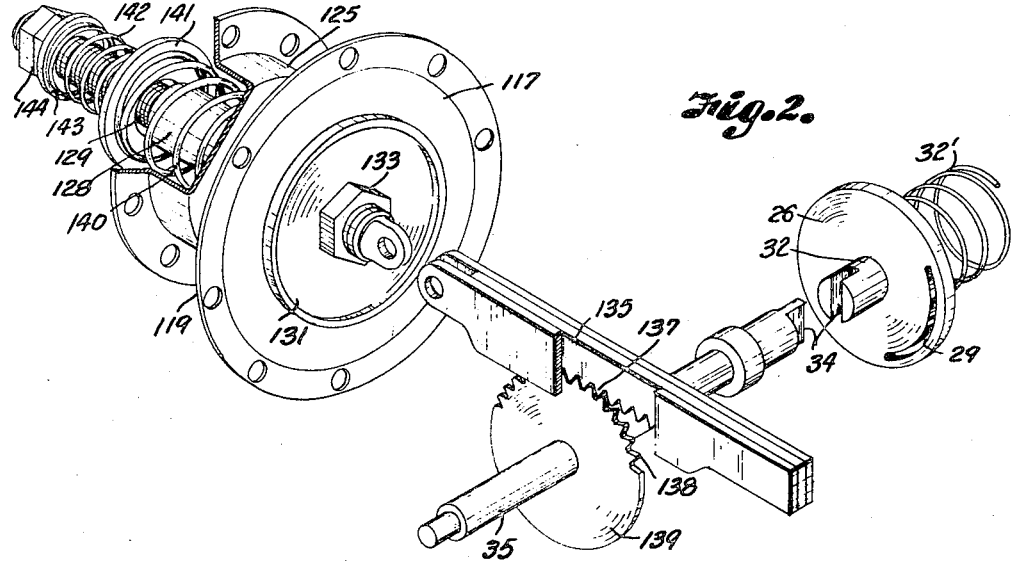
Fig. 2 is an enlarged perspective view of the fuel regulating valve, its automatic actuator and the driving connection therebetween, the respective parts being shown in disassembled spaced relation and portions broken away to better illustrate the construction.

Referring more in detail to the drawings:

1 designates a fuel feeding apparatus embodying the features of the present invention and which is utilized for feeding liquid fuel from a source of supply and for preparing a combustible mixture to be delivered to an internal combustion engine operating under varying load and/or speed conditions; for example, the motor of a motor vehicle. The apparatus includes a fuel pumping unit 2 having a fuel inlet 3 that is connected by a suitable duct 4 with a source of liquid fuel (not shown). The outlet 5 of the pumping unit is connected by a duct 6 leading to a surge chamber 7 which in turn is connected by means of a duct 8 with the fuel inlet connection 9 of a carbureting unit 10.

The carbureting unit 10 is illustrated as of the downdraft type, but it should be understood, however, that an updraft carburetor can be embodied with the principles of the present invention. The carburetor unit includes a cylindrical body 11 having a flow passageway 12 of substantially uniform cross section throughout its length for conducting combustion supporting air from an air inlet 13 at one end to an outlet connection 14 at the other end. The outlet is adapted to be connected with the intake manifold of an internal combustion engine (not shown). Mounted on the side of the tubular body is a valve chest 15 having a boss 16 extended within an opening 17 formed in the side of the body of the carburetor at a point in substantial alignment with the inlet of the fuel supply duct 8. The opposite end of the valve chest has a similar boss 18 extending into an opening 19 in the carburetor body. The valve chest has fuel compartments 20 and 21 in its outer face which are covered by plates 22 and 23. The plate 22 has an internally threaded collar 24 for receiving the connection with the fuel supply duct 8. The plate is removably retained in position by suitable fastening devices such as screws 25. Located within the fuel compartment 20 is a substantially disk-shaped head 26 that is seated against the side of the compartment for valving an arcuate-shaped port 27 to a main fuel jet nozzle 28. The head 26 of the valve has a slot-like arcuate-shaped port 29 adapted to register with the arcuate-shaped port 27 when the valve opens. The fuel jet nozzle 28 includes a nipple threaded into a socket 30 opening from the inner face of the boss 16 and which is preferably provided with a shield 31 directed inwardly of the air flow passageway 12 for breaking up the fuel into droplets so that they are readily picked up by the combustion supporting air.

The valve head 26 includes a hub 32 oscillatably mounted within an axial bore 33 of the boss 16 and which is coupled as at 34 with one end of an actuating shaft 35 that has its opposite end journalled within a socket 36 in the opposite wall of the carburetor body as shown in Fig. 4. The valve head is yieldingly retained against its seat by a spring 32'.

The carburetor body is provided below the fuel jet nozzle 28 with a throttle valve 37 of the butterfly type and which is adapted to close the flow passageway 12 through the carburetor slightly below an idling jet orifice 38 connected with the fuel compartment 21. The butterfly valve is carried on a shaft 39 rotatably mounted in the opposite side walls of the carburetor body and which has an arm 40 fixed on the projecting end thereof and which is adapted to be connected with a throttle actuator (not shown) of the vehicle with which the fuel feeding apparatus is to be associated. The fuel compartments 20 and 21 are interconnected by a channel 41 so that the idling jet is supplied from the pump 2. The portion of the fuel admitted through the idling jet is regulated by means of an adjusting screw 42 having a needle-like stem 43 adapted to seat within the orifice 38 and which also includes a threaded portion 44 engaging threads in a bore 45. Threaded into the outer end of the bore is a nipple 46 journalling the stem and which has an operating handle 47 by which the stem may be rotated to move the needle point of the valve to and from the idling jet orifice. The stem portion of the adjusting screw is sealed by means of a packing nut 48 that is threaded in the outer end of the nipple so as to provide leak-tight connection about the stem.

Figure 1:
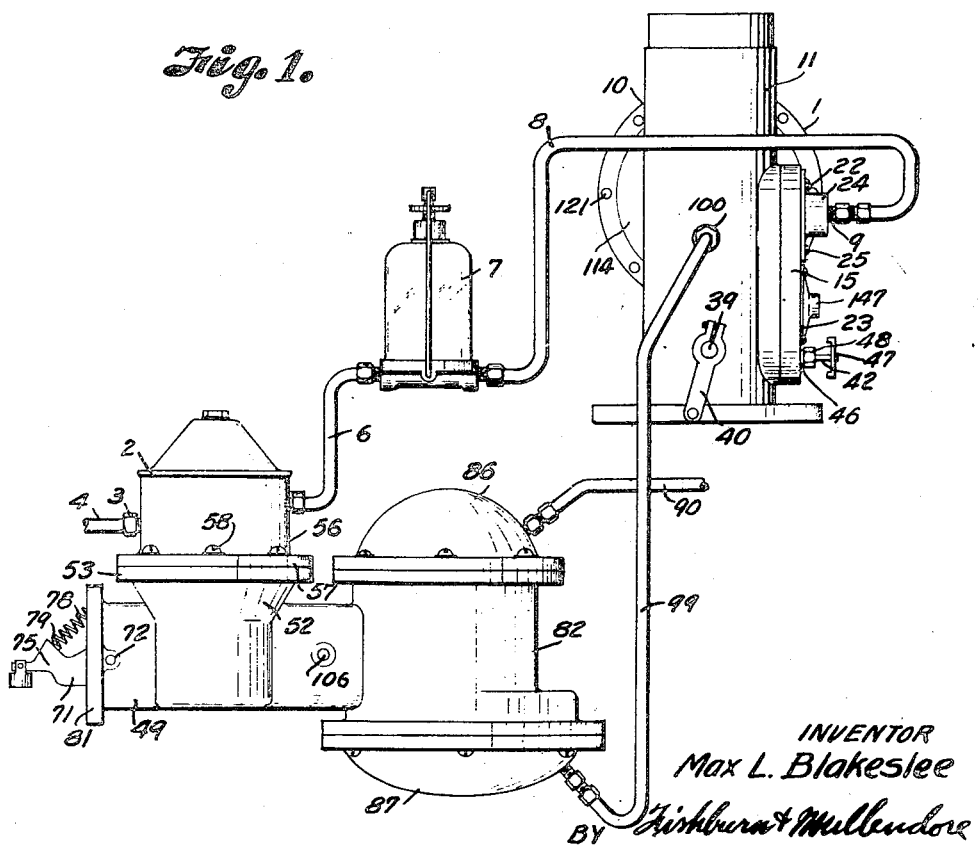
Fig. 1 is a side elevational view of a fuel feeding apparatus embodying the features of the present invention.

The pump 2 may be of somewhat conventional design and is here illustrated as including a tubular body casing 49 having a rocker arm compartment 50 extending therethrough and which is connected with a lateral diaphragm compartment 51 formed within a lateral extension 52 of the casing which has an annular flange 53 for seating the marginal edge portion 54 of a pump diaphragm 55. Seated on the marginal edge of the diaphragm is a valve housing 56 including a companion flange 57 that is secured to the flange 53 by suitable fastening devices such as screws 58. Provided within the valve housing on the upper side of the diaphragm is a fuel chamber 59 that is connected through an inwardly opening check valve 60 with the inlet connection 3 through a passageway 61 formed adjacent a partition 62 that divides the valve housing into an inlet and discharge chamber 63 and 64. The outlet compartment 64 is connected with the pump chamber 59 through an outwardly opening check valve 65. The diaphragm is reinforced on the upper side by a disk 66 and on the lower side by a spring seat 67 seating the disk which seats the larger end of a conical spring 69 which encircles a diaphragm stem 70 that is reciprocable under actuation of a rocker arm 71. The rocker arm 71 is pivotally mounted on a transverse shaft 72 that extends across the compartment 50 as shown in Fig. 1. The inner end 73 of the arm is of substantially hook shape and is engaged in an eye or yoke 74 in the diaphragm stem 70. The opposite end of the rocker arm carries a head 75 that is adapted to be engaged by a push rod or tappet 76 operated from the cam shaft (not shown) of the motor with which the present invention is to be used. The smaller end of the spring 69 seats within a spring seat 77 that is carried slidably on the diaphragm stem 70 and which normally engages against the end of a lever to be hereinafter described. The head 75 is normally retained against the push rod by a coil spring 78 that is seated against an abutment 79 on the rocker arm and against a shoulder 80 on the pump body casing 49. The pump casing 49 has a flange 81 by which it is connnected to the motor vehicle in accordance with the customary practice.

With the apparatus thus far described, fuel is delivered from the source of supply through the duct 4 to the inlet chamber 63 for flow into the pump chamber 59 upon unseating of the inlet check valve 60 upon downstroke of the diaphragm 55 as actuated from the internal combustion engine through the rocker arm 71. On the upward movement of the diaphragm 55, the inlet check valve 60 seats and the outlet check valve 65 opens to discharge the liquid fuel through the duct 6 into the surge chamber 7 and from the surge chamber through the duct 8 into the fuel chambers 20 and 21 of the carburetor.

The structure thus far described is more or less typical of a standard present day fuel feeding system with the exception that the air flow passageway of the carburetor is not provided with a venturi to create a pressure differential usually required to assure admission of the fuel into the carburetor at different speeds. Another distinction is that with the present invention no float or float chamber is required to regulate flow of fuel. The venturi of a conventional carburetor limits the supply of air to the motor through the air intake under maximum operating conditions and consequently results in lowering the volumetric efficiency of the motor. Furthermore, the conventional venturi does not effect withdrawal of the proper amount of fuel to form a correct air and fuel mixture for all operating conditions of the motor to which the carburetor is connected. Consequently, there has to be the customary compromise between good idling and maximum power conditions. This is well recognized by the necessity of a manual or automatic choke for increasing the pressure differential in order to supply the fuel under certain atmospheric conditions. To overcome in part the difficulties of venturi operation, conventional carburetors are provided with fuel accelerating pumps, but such pumps often times supply unnecessary fuel to the motor.

These objectionable features of conventional carbureting systems are overcome by the present invention which provides for the proper fuel mixture under all operating conditions of the motor. This is effected in the present invention by providing means for controlling action of the fuel pump responsive to the variable pressure conditions as brought about through operation of the motor under varying speed, load and atmospheric conditions. The fuel pump is, therefore, provided with means for automatically controlling the effective action of the diaphragm so that fuel is delivered by the pump in quantities depending upon operating requirements of the engine.

Formed on the pump casing at the end opposite the rocker arm 71 is a substantially cylindrical extension 82 containing a compartment 83 having its axis parallel with the axis of the diaphragm stem 70. The opposite ends of the compartment 83 are closed by flexible diaphragms 84 and 85 of differential area, the differential area being brought about through enlargement of the chamber 83 immediately adjacent the diaphragm 85. The diaphragms are retained in position by substantially concavo-convex heads 86 and 87 and which cooperate with outer faces of the diaphragm to form variable pressure chambers 88 and 89. The chamber 88 has connection through a duct 90 with the intake manifold (not shown) or with the carburetor on the manifold side of the throttle valve 37 so that when the motor is in operation fluctuating vacuum conditions are normally maintained within the chamber 88 to act on the diaphragm 84 to pull the diaphragm inwardly in opposition to a spring 91 that is seated against a reinforcing disk 92 and which has its opposite end sleeved over a boss 93 of the head 86. The inner side of the diaphragm 84 is reinforced by a similar plate 94, the plates and diaphragm being connected together by a stem 95 extending through registering openings therein and which has threads 96 for mounting nuts 97 and 98 by which the plates and diaphragm are clamped together to provide a leak-tight connection around the stem 95.

The chamber 89 is connected by a duct 99 with the air flow passageway of the carburetor on the air inlet side of the throttle valve as indicated at 100 whereby the pressures on that side of the throttle valve act to influence position of the diaphragm 85. Diaphragm 85 is reinforced on the respective sides thereof by plates or disks 101 and 102 that are clamped thereagainst by a threaded stem 103 that extends through registering openings in the plates and diaphragm and which is provided with nuts 104 and 105 by which the parts are drawn together to form a tight connection.

Pivotally mounted on a shaft 106 at the end of the compartment 50 opposite the rocker arm previously described is a lever 107 having one end engaging under the spring seat 77. The opposite end of the lever extends within the compartment 83 and is pivotally connected with the stem 103 of the diaphragm 85 by a link 108, the connection with the stem being made by a cross pin 109 and with the lever arm by a cross pin 110. The stem 95 of the diaphragm 84 seats within a cup-like socket 111 that has an ear 112 pivotally mounted on the lever at a point between the cross pin 110 and the pivot shaft 106, the ear being connected by means of a cross pin 113.

It is thus obvious that both diaphragms act on the lever so as to control position of the lever in correspondence with pressures created on the respective sides of the throttle valve. It is also obvious that the position of the lever controls action of the spring of the pump diaphragm. For example, when the movement of air on the inlet side of the valve is low as under idling conditions, the lever arm moves in a clockwise direction to compress the spring and thereby increase the pressure effected by the pump diaphragm. When the pressure increases, the rocker arm moves in the opposite direction to relieve action of the spring 69 on the pump diaphragm and, consequently, the pressure on the fuel in the pump chamber is likewise reduced. When the vacuum is strong in the diaphragm chamber 88, the diaphragm reduces the pressure exerted by the spring 91 and when the vacuum effect lessens, the spring 91 becomes effective on the lever 107.

In order to automatically control the port 27, means is provided for actuating the shaft 35 responsive to air velocities in the air inlet end of the carburetor. The control being such that when the suction is low the port 27 is closed by the valve 26 and as the velocity increases the valve is turned to bring the arcuate port 29 into registry with the port 27. This is accomplished by providing a side of the carburetor with a substantially circular extension 114 forming a relatively shallow circular recess 115 connected with the air flow passageway 12 through a lateral opening 116. Closing the outer side of the recess 115 is a diaphragm 117 having its marginal portion engaging a seat 118 encircling the recess 115. The diaphragm is retained in position by means of a cap 119 having a flange 120 seated on the marginal edge of the diaphragm and retained by screws 121. Atmospheric pressure is admitted to the interior of the cap housing through an air vent 122. The cap 119 has a seat 123 encircling an opening 124 for mounting a spring seat 125 and a cover 126 that are secured by fastening devices such as screws 127. The spring seat 125 carries a tubular guide 128 for a stem 129 of the diaphragm 117, the stem being secured to the diaphragm by means of plates 130 and 131 engaging the respective sides thereof and are secured in position by nuts 132 and 133 threaded onto the stem, as best shown in Fig. 3. The end of the stem that projects through the diaphragm is pivotally connected by a pin 134 with a rack bar 135 that is slidably mounted within an opening 136 formed in the opposite wall of the carburetor. The rack bar has teeth 137 that mesh with teeth 138 on a pinion 139 that is fixed to the valve operating shaft 35 previously described.

Encircling the guide sleeve 128 and having one end engaging the spring seat 125 is a coil spring 140 which has its other end engaging a spring seat 141 slidable on the guide sleeve and which also seats on the opposite side, one end of a spring 142 of lighter action than the spring 140. The other end of the spring 142 engages a spring seat 143 that is adjustably positioned on the stem 129 by means of adjusting nuts 144 backing the spring seat and threaded onto the end of the diaphragm stem as shown in Fig. 3.

In order to overcome pulsations in the fuel reaching the carburetor and to maintain substantially constant flow during slow engine speeds, particularly when idling, the fuel compartment 21 has one side formed by a diaphragm 145 that is retained in position by the plate 23. The diaphragm is urged to act on the fuel in the chamber by a spring 146 enclosed within a spring compartment 147 formed on the plate 23. The spring is compressed on pressure impulses of the pump and expands to maintain pressure on the fuel during the intake stroke of the pump diaphragm. The compartment 147 is vented by an aperture 148 in the plate 23.

In operation, it is assumed that the apparatus constructed as described is connected with an internal combustion engine of a motor vehicle so that the carburetor unit is in connection with the engine intake manifold and the rocker arm 71 of the pump is operated in time with the crank and cam shafts of the engine. It is also assumed that the fuel duct 4 is in connection with the fuel supply tank, that the fuel discharge duct 6 is in connection through the surge chamber 7, that the duct 6 is in connection with the carburetor unit, and that the ducts 99 and 90 are respectively in connection with the carbureting system on the respective sides of the throttle valve whereby the diaphragm 84 is subject to pressures on the engine side of the throttle and the diaphragm 85 to pressures on the air inlet side of the throttle.

With the motor not running, obviously there is no vacuum conditions in the carbureting unit and the pressures acting in the diaphragm chambers 88 and 89 are atmospheric. Upon turning of the starter and the throttle valve being practically closed, the pistons of the engine produce a vacuum or suction below the throttle 37 of the carburetor unit. The pump diaphragm 55 is also operated to deliver fuel to the fuel compartments 20 and 21 of the carbureting unit. With the motor starting, the vacuum increases according to the temperature, the volume of air intake and the load on the motor. The pressure condition in the carbureting unit is such that the valve 26 is closing the port 27 but fuel is supplied through the idling port 38 until the pressure conditions in the carburetor are sufficient to cause the diaphragm 117 to be effective in actuating the fuel adjusting valve 26 to properly regulate the supply of fuel discharged through the jet nozzle. During starting, the absence of vacuum conditions in the carburetor allow for fuel to be delivered at greater pressure since the spring 91 holds the lever 107 in position to compress the pump spring and effect greater pressure on the fuel to cause flow of the fuel in sufficient volume for starting purposes; consequently, no chokes are necessary.

Description of operation of device during idling conditions

Upon idling, the throttle valve 37 is closed, consequently, the vacuum in the manifold of the engine is at a maximum. This extreme vacuum condition is transferred to the fuel pump in the chamber 88, thereby causing the diaphragm 84 to exert the extreme pressure against action of the spring 91. This relieves pressure on the lever 107 and results in a counter-clockwise rotation thereof, taking pressure off the pump diaphragm spring 69 to relieve pressure on the pump diaphragm, thereby relieving pressure on the fuel discharge to the carbureting unit. Under idling conditions the load on the motor is at a minimum and the R. P. M. of the motor is also at a minimum. Since the movement of the pump is in direct ratio with the R. P. M. of the motor, the pulsations of the pump diaphragm are, likewise, reduced so that a minimum of pressure is exerted by the pump diaphragm on the fuel delivered to the carbureting unit. Consequently, the pressure on the fuel is relatively light and were it not for the action of the spring 146 acting on the diaphragm 145, there would be very little pressure on the fuel between strokes to cause rough idling; but with the spring 146 depressed by each pulsation, the spring acts during the intermission to maintain substantially constant pressure on the fuel in the equalizing chamber to deliver the fuel at constant flow through the idling port 38. The main jet is closed under these conditions because with the throttle valve closed, there is relatively little air flow through the carburetor and the springs 140 and 142 are effective to pull the diaphragm back so that the rack holds the gear with the adjusting shaft 35 in position to maintain closure or substantial closure of the port to the main or primary fuel jet nozzle 28.

Operation in going from idling to rapid acceleration of the motor

In starting to accelerate rapidly, the throttle valve 37 is opened to a wide position. Upon opening of the throttle, increase in air flow to the engine manifold instantly decreases the vacuum. The vacuum condition in the chamber 88 decreases correspondingly permitting the spring 91 to depress the diaphragm 84 and cause a clockwise movement of the lever 107 exerting pressure on the pump spring 69. The air flow into the carburetor is increased by the opening of the throttle valve and this air flow condition is reflected in the diaphragm chamber 89 through aspiration of air from the duct connection 99, lowering the pressure in the chamber 89 and causing the diaphragm to depress which results in additional pressure being put on the spring through the lever 107. Increased action of the pump through increase in R. P. M. of the motor causes increase in pulsations of the pump diaphragm. Under these conditions, the combined speed up of the pump pulsations with increased pump pressure on the fuel, combine to deliver the proper amount of the fuel under proper pressure to the jet of the carburetor to take care of the motor's needs during such rapid acceleration. At substantially the time the throttle valve was opened, the fuel under proper pressure is available at the jets. The increased air flow by the opening 118 causes the diaphragm 117 to act in overcoming the spring action of the control springs 140 and 142 so that the control valve 26 automatically functions to open the port 27 in accordance with the need of the motor. Opening of the regulating valve is effected by the rack bar 135 acting on the pinion 139 to cause rotation of the shaft 35 and valve head 26 to bring the elongated port or orifice 29 therein in cooperation with the elongated port 27, thus opening the main jet in accordance with the fuel needs of the motor.

The response of the pump is instantaneous and the supply of fuel is adequate to compensate for the small compression of the spring 146 together with any compression of the air in the surge chamber 7.

Operation at extreme speed and constant load

The throttle 37 is wide open and the air flow through the carburetor above the throttle is at a maximum. Under these conditions, the resistance developed in the air cleaner which is usually connected with the air inlet of the carburetor is more noticeable as this resistance and other factors cause a decrease in manifold pressure. In accordance with the present invention, lack of manifold pressure results in increased pressure on the fuel.

At low manifold pressures when maximum pressure on the fuel is desired and most needed, the diaphragm 85 is exerting its maximum pressure on the fuel through the lever 107 as above described. It may be further explained that the stem 95 is permitted to slide in and out of the socket 111 so that under these extreme speed conditions, an increased vacuum will not in itself pull pressure off the fuel, but will necessitate the air flow mechanism carrying an increased portion of the load of applying increased pressure on the fuel in the pump. Under this condition, the extreme air flow through the carburetor is exerting maximum suction on the diaphragm 117, resulting in the extreme opening of the main or primary fuel jet.

Operation from extreme speed to idling

When the throttle valve 37 is instantly closed vacuum builds up in the manifold and the air flow into the carburetor is reduced with the resultant action of diaphragm 117 which closes the main jet. The increased vacuum reflects in the chamber 88 to cause the diaphragm to pull in against action of the spring 91, thereby relieving pressure on the lever 107 and reducing the pump pressure. Thus, the fuel flow is reduced according to the lesser demand as the motor speed is reduced.

Attention is directed to the purpose of the surge chamber 7. The action resulting in handling a fuel under some extreme atmospheric conditions is detrimental to the proper operation of the fuel system. The very positive action in sucking and stretching the fuel in bringing it to the pump from the fuel tank supply and then subjecting it to pressure will, in combination with a maximum heat condition, influence slight vapor lock, but with the use of the surge chamber 7, this condition is corrected.

What I claim and desire to secure by Letters Patent is:

1. In an apparatus of the character described, carbureting means through which combustion supporting air is adapted to be passed in variable flow volume in response to operating conditions of an internal combustion engine and having an air inlet and a fuel mixture outlet, a fuel inlet intermediate the air inlet and fuel mixture outlet, said outlet being adapted to be connected with the intake manifold of an internal combustion engine, a fuel pump adapted to be actuated by the engine, a source of fuel supply, a flow duct connecting the source of fuel supply and pump with the fuel inlet of the carbureting means for supplying fuel to the carbureting means under pressure of the pump for mixture with said combustion supported air, a throttle in said carbureting means between the fuel inlet and said fuel mixture outlet for controlling flow of the fuel mixture to the engine, a mechanism for modifying actuation of the pump to vary the fuel supply to the inlet of the carbureting means including separate pressure chambers having opposing diaphragms forming adjacent sides of said pressure chambers with adjacent faces of said diaphragms subject at all times to atmospheric pressure, duct means connecting one of said chambers with the carbureting means on the fuel and air inlet side of the throttle to subject the diaphragm forming a side of said chamber to the pressure existing in the carbureting means on the fuel and air inlet side of the throttle, duct means connected with the other chamber and adapted to be connected at the outlet side of the throttle whereby the diaphragm forming a side of said chamber is subject to the pressure existing on the outlet side of the throttle, means connecting the respective diaphragms with the pump to modify operation of the pump responsive to the respective pressure on the respective sides of the throttle, a fuel control valve connected with said supply duct, and an actuating means for the fuel control valve including a diaphragm responsive to the pressure acting on the inlet side of the throttle.

2. In an apparatus of the character described, carbureting means through which combustion supporting air is adapted to be passed in variable flow volume in response to operating conditions of an internal combustion engine and having an air inlet and a fuel mixture outlet, a fuel inlet intermediate the air inlet and fuel mixture outlet, said outlet being adapted to be connected with the intake manifold of an internal combustion engine, a fuel pump adapted to be actuated by the engine, a source of fuel supply, a flow duct connecting the source of fuel supply and pump with the fuel inlet of the carbureting means for supplying fuel to the carbureting means under pressure of the pump for mixture with said combustion supported air, a throttle in said carbureting means between the fuel inlet and said fuel mixture outlet for controlling flow of the fuel mixture to the engine, a mechanism for modifying actuation of the pump to vary the fuel supply to the inlet of the carbureting means including separate pressure chambers having opposing diaphragms forming adjacent sides of said pressure chambers with adjacent faces of said diaphragms subject at all times to atmospheric pressure, duct means connecting one of said chambers with the carbureting means on the fuel and air inlet side of the throttle to subject the diaphragm forming a side of said chamber to the pressure existing in the carbureting means on the fuel and air inlet side of the throttle, duct means connected with the other chamber and adapted to be connected at the outlet side of the throttle whereby the diaphragm forming a side of said chamber is subject to the pressure existing on the outlet side of the throttle, means connecting the respective diaphragms with the pump to modify operation of the pump responsive to the respective pressure on the respective sides of the throttle, a fuel control valve connected with said supply duct, an actuating means for the fuel control valve including a diaphragm responsive to the pressure acting on the inlet side of the throttle, said carbureting means having a pulsation compensating chamber in connection with the supply duct ahead of the fuel control valve, and a spring pressed diaphragm in the compensating chamber to compensate for pulsations in the fuel delivered to the control valve.

3. In an apparatus of the character described, carbureting means through which combustion supporting air is adapted to be passed in variable flow volume in response to operating conditions of an internal combustion engine and having an air inlet and a fuel mixture outlet, a fuel inlet intermediate the air inlet and fuel mixture outlet, said outlet being adapted to be connected with the intake manifold of an internal combustion engine, a fuel pump adapted to be actuated by the engine, a source of fuel supply, a flow duct connecting the source of fuel supply and pump with the fuel inlet of the carbureting means for supplying fuel to the carbureting means under pressure of the pump for mixture with said combustion supported air, a throttle in said carbureting means between the fuel inlet and said fuel mixture outlet for controlling flow of the fuel mixture to the engine, a mechanism for modifying actuation of the pump to vary the fuel supply to the inlet of the carbureting means including separate pressure chambers having opposing diaphragms forming adjacent sides of said pressure chambers with adjacent faces of said diaphragms subject at all times to atmospheric pressure, duct means connecting one of said chambers with the carbureting means on the fuel and air inlet side of the throttle to subject the diaphragm forming a side of said chamber to the pressure existing in the carbureting means on the fuel and air inlet side of the throttle, duct means connected with the other chamber and adapted to be connected at the outlet side of the throttle whereby the diaphragm forming a side of said chamber is subject to the pressure existing on the outlet side of the throttle, means connecting the respective diaphragms with the pump to modify operation of the pump responsive to the respective pressure on the respective sides of the throttle, a fuel control valve connected with said supply duct, an actuating means for the fuel control valve including a diaphragm responsive to the pressure acting on the inlet side of the throttle, said carbureting means having a pulsation compensating chamber in connection with the supply duct ahead of the fuel control valve, a spring pressed diaphragm in the compensating chamber to compensate for pulsations in the fuel delivered to the control valve, a starting jet having discharge into the carbureting means between the throttle and fuel mixture outlet and connected with the compensating chamber for supplying fuel to the engine independently of the fuel supplied through the control valve.

MAX L. BLAKESLEE.

REFERENCES CITED

The following references are of record in the file of this patent:

UNITED STATES PATENTS

| Number | Name | Date |
| --- | --- | --- |
| 1,500,647 | Shackleton et al. | July 8, 1924 |
| 1,643,479 | Williams, Jr. | Sept. 27, 1927 |
| 1,970,626 | Rockwell | Aug. 21, 1934 |
| 1,996,590 | Rockwell | Apr. 2, 1935 |
| 2,008,143 | Mock | July 16, 1935 |
| 2,104,446 | Babitch et al. | Jan. 4, 1938 |
| 2,261,490 | Weber | Nov. 4, 1941 |
| 2,264,347 | Udale | Dec. 2, 1941 |
| 2,314,170 | Snyder | Mar. 16, 1943 |
| 2,348,008 | Hunt | May 2, 1944 |
| 2,382,625 | Garretson | Aug. 14, 1945 |
| 2,406,115 | Stephan | Aug. 20, 1946 |
| 2,428,377 | Morris | Oct. 7, 1947 |
| 2,445,099 | Wirth | July 13, 1948 |